(12) United States Patent
Macmillan (10) Patent No.: US 7,284,393 B1
(45) Date of Patent: Oct. 23, 2007

(54) BARBECUE UTILITY SERVER CART (76) Inventor: Christopher D. Macmillan, P.O. Box 159, Wind Gap, PA (US) 18091-0159

( * ) Notice: Subject to any disclaimer, the term of this patent is extended or adjusted under 35 U.S.C. 154(b) by 234 days.

(21) Appl. No.: 11/042,715

(22) Filed: Jan. 24, 2005

(51) Int. Cl.
F25D 3/08 (2006.01)
(52) U.S. Cl. .................. 62/457.7; 62/331; 62/371
(58) Field of Classification Search .................. 62/331, 62/371, 457.5, 457.7
See application file for complete search history.

(56) References Cited

U.S. PATENT DOCUMENTS 4,515,421 A * 5/1985 Steffes ...................... 312/351
5,259,215 A * 11/1993 Rocca ......................... 62/371
6,374,839 B2 * 4/2002 Patarra ......................... 135/16
6,474,097 B2 * 11/2002 Treppedi et al. ........... 62/457.7
6,792,935 B2 * 9/2004 Williams et al. .......... 126/41 R
6,796,319 B1 * 9/2004 Patarra et al. ................ 135/16

* cited by examiner

Primary Examiner—Melvin Jones
(74) Attorney, Agent, or Firm—Charles A. Wilkinson; Clinton H. Wilkinson (57) ABSTRACT A convertible barbecue server and accessory cart formed of molded plastic which has a removable tray-type top which can be removed and used indoors either in inclement weather or for placement of food items in the food tray prior to rejoining it with the cart bottom for serving food outdoors in conjunction with barbecuing or in the serving of food to guests or others.

18 Claims, 10 Drawing Sheets

BARBECUE UTILITY SERVER CART

BACKGROUND OF THE INVENTION

1. Field of the Invention

The present invention relates generally to utility or accessory carts and more particularly to utility and accessory carts and caddies for use with barbecue and outdoor grill equipment and carts, and more particularly still to utility and accessory carts that are convertible for both summer or other warm weather use, and for use indoors during cold or inclement weather.

2. Preliminary Discussion

Home barbecue and outdoor grill equipment is now almost ubiquitous in the well-equipped American home as well as in many homes in foreign countries. Sometimes such barbecues are in the form of permanent backyard structures, but more frequently they take the form of a portable charcoal or gas burner which is stored indoors and then taken outside to a patio or yard, or frequently in more recent times, taken onto an outer deck or balcony, where the fumes from the burner presumably do not pollute the indoor atmosphere of the user's living space. While some barbecues and grills are small and can simply be carried outdoors, the typical modern barbecue or grill will be carried on a cart which can be wheeled or stored outdoors. Frequently, such carts may have storage space behind doors or on the sides to store supplies. Such storage space is frequently not used for anything except essential supplies, because the barbecue operator is also frequently somewhat untidy and the whole cart may be difficult and time-consuming to keep clean. Not infrequently, therefore, such carts are left outdoors to be cleaned by the elements.

More recently, auxiliary workstation carts have made their appearance for use in conjunction with the usual barbecue equipment. Such auxiliary or work station carts are designed to provide storage space and additional countertop space for food preparation and serving and, as indicated in advertisements at least for such auxiliary carts, make it almost like bringing a kitchen outdoors' or in other words, make outdoor cooking as convenient as cooking indoors.

One large drawback with previous work station and accessory carts, which drawback is the same as for barbecue equipment carts, is the fact that while they take up a fair amount of space, they are used most frequently during the warmer weather months and during the rest of the year they take up space in the owner's garage, storage space, or frequently anywhere in which some "out of the way" room or space can be found.

It is the aim of the present invention to provide a combined work station and server cart for outdoor warm weather use in barbecuing or other serving of food, a portion of which cart is convertible for use as an indoor server that takes up considerably less space and can be used indoors during inclement or just plain cold weather, thereby essentially doing double duty by serving as an outdoor workstation and server cart plus an indoor server. Such interconvertibility is accomplished by providing for the cart a lift off, or removable, top which can then be simply carried into and about the home with food, ice, utensils and the like provided in the top. Thus, a single utility cart is enabled to be used in two or actually three ways. The removable top or server can, when lifted off, be simply placed on a counter top or floor, resting preferably on small feet located on the bottom of the tray top, such removable server top in warm weather being placable, or positionable, on the top of the lower portion of the utility cart with the feet of the server tray fitting on to the main bottom portion of the cart with the feet on the tray or server portion fitting into recesses in the top of the cart, thereby preventing the removable top from sliding off the lower portion of the cart. When used indoors, such feet enable the tray or server portion to be supported away or slightly raised from whatever surface it is placed upon. The combined utility cart of the invention has three principal uses (a) as a server on wheels to be used with barbecue equipment, (b) as a portable server tray which can be removed from the wheeled cart portion and carried indoors either to be loaded and carried out again to its own mobile base outdoors and used for serving or to be loaded with comestibles, or foods, preferably in a subsidiary tray or trays which can be placed in the main tray, and (c) as an auxiliary barbecue cart in which barbecue equipment and ingredients are contained and transported in the cabinet of the main body portion of the cart.

In an alternative embodiment, the removable top tray may have greater or longer length removable or foldable legs for its own support at a convenient height. The food server top portion also preferably has a pivoting transparent cover to protect food items contained in trays or compartments in the top.

Consequently, the server tray provided on the top of the utility server cart of the invention can be used both outdoors on its own wheeled base, plus used indoors as a server in inclement or other undesirable weather, thus doing double duty. It can also be used to transport comestibles between a kitchen and an outdoor barbecue station already supplied with food or comestibles already arranged for eating. Meanwhile, the lower portion of the cart which has storage room within it behind doors, plus at least one fold out tabletop or serving tray type arrangement to provide additional workspace, serves as a barbecue utility cart for outdoor use which will usually simply be stored during the off-season for outdoor eating. The convertible utility cart of the invention, because it has a stand-alone upper top in the form of a food server tray, provides a much more convenient utility server cart than has previously been available, it's double duty features being very attractive to those who frequently entertain guests at barbecues, lunches, or brunches in these hurried times when space and time are at a premium.

Preferably, the removable tray portion of the utility and server cart of the invention is provided with a compartment or arrangement in which ice may be placed which ice in the form of chips or cubes can then flow outwardly coming into contact with the bottom and sides of cold comestible trays supported in the main tray. If desired, other insulated trays may be used in which hot foods may be placed. If these are to be used along with the cold trays, they will be doubly or triply insulated to maintain their heat content and may even be supplied with hot water compartments to increase their heat retaining capacity.

3. Description of Related Art

While there have been utility carts in the past, the present inventor is not familiar with any utility or accessory cart convertible in the manner of his. The inventor is aware, however, of the following prior art relating to devices in the category of utility carts and related structures:

U.S. Pat. No. 2,897,999 issued to R. H. Bishop on Aug. 4, 1959, entitled "Container With Tray Lids," discloses a simple container with hinged lids which pivot downwardly to the outer sides of the container so they are out of the way when accessing the storage area. The outer or top side of the lids have a trap-like shape to facilitate placement of articles thereon. For example, items taken out of the container through one open lid can be placed on the tray portion of the other lid. Bishop teaches a basic container which could be used to serve food and the like.

U.S. Pat. No. 3,515,119 issued to S. E. Kivela on Jun. 2, 1970, entitled "Food Carrying and Preparing Appliance," discloses a handle (13), rectangular housing (1), insulated food drawing (5), drop front (8) which serves as a work surface or burner (9), and storage space (12). The Kivela food case is designed more for carrying and then preparing simple foods, rather than simply keeping already cooked or prepared foods cool or protected against contact by insects and the like.

U.S. Pat. No. 4,027,727 issued to G. Pullens on Jun. 7, 1977, entitled "Portable Battery Operated Hot-Cold Storage Unit," discloses a battery operated insulated storage container for keeping food items either in a hot or cold condition.

U.S. Pat. No. 4,685,483 issued to M. A. Balazs on Aug. 11, 1987, entitled "Collapsible Support for Food Screen," discloses a framework for maintaining a cloth screen over dishes on a hotel serving cart being designed, mainly so that the covering does not come into contact with the food.

U.S. Pat. No. 4,873,841 issued to W. Bradshaw et al. on Oct. 17, 1989, entitled "Portable Cooler," discloses a cooler having rear wheels and a pulling handle on the side opposite the rear wheels.

U.S. Pat. No. 4,910,975 issued to D. A. Derby on Mar. 27, 1990, entitled "Condiment Cooler," discloses a small container for cooling foods comprised of an insulated chest having an open top in which ice may be placed, and several compartments which extend into the chest in which the food items are stored. The ice contacts the walls of the compartments, thereby cooling the items in such compartments. The Derby condiment cooler is an example of inserts used in the upper section of an insulated compartment.

U.S. Pat. No. 5,437,165 issued to R. W. White et al. on Aug. 1, 1995, entitled "Food Organizer Insert for Portable Ice Chest," discloses a horizontally disposed template designed to be placed in a portable ice chest. The template includes various sized and shaped receptacles for receiving and holding primarily food items. The cover of the ice chest acts as a plastic bug cover, which cover may be entirely separable from the chest or may be hinged secured thereto.

U.S. Pat. No. 5,480,170 issued to R. B. Kaiser, II on Jan. 2, 1996, entitled "Cooler Caddy, and Methods of Constructing and Utilizing Same," discloses an insulated cooler having wheels, one or more foldable trays (26), and means for supporting an umbrella (84) (see FIG. 8). The wheels are removable or foldable in one embodiment so that the cooler is supported on telescoping legs (86) which allow the elevated position of the cooler to be adjusted.

U.S. Pat. No. 5,493,874 issued to M. A. Landgrebe on Feb. 27, 1996, entitled "Compartmented Heating and Cooling Chest," discloses an insulated carrying case having both hot and cold storage compartments side by side.

U.S. Pat. No. 5,551,774 issued to A. Campbell et al. on Sep. 3, 1996, entitled "Food Bar With Modular Support System," discloses a food bar of a well known type such as commonly found in supermarkets or the like wherein a large insulated chamber is filled with ice and various sized and shaped food receptacles which fit over the top surface of the chamber are used to accommodate food containers.

U.S. Pat. No. 5,605,056 issued to A. C. Brown et al. on Feb. 25, 1977, entitled "Portable Cooler With Suspended Grate for Ice-Free Storage Areas," discloses a cooler having several drawers and a tray as well as areas for supporting ice around the items placed in such drawers and trays. Brown et al. generally illustrates a cooler having special apparatus for holding food or other items placed in the cooler, and in which the ice does not directly contact the food items.

U.S. Pat. No. 5,876,047 issued to M. S. Dennis on Mar. 2, 1999, entitled "Utility Cart," discloses a cart having a wagon-like appearance and including an ice chest (19) as well as a storage compartment (10) for holding various accessory equipment. The cart also includes drop leaf table panels (32) which are movable to a horizontal position, and umbrella support (60), and can be used to support or transfer folding lawn chairs or the like.

U.S. Pat. No. 5,975,325 issued to A. Wallace on Nov. 2, 1999, entitled "Food Enclosure," discloses a folding enclosure having two open sides and two open ends, as well as a skirt (20) which fits over such open sides and ends, and a canopy over the top of the structure.

U.S. Pat. No. 6,086,073 issued to T. A. Tisbo et al. on Jul. 11, 2000, entitled "Portable Work Center," discloses a molded storage cabinet having a wheel assembly (32) along one bottom edge and at least one pair of support legs along the other bottom edge, the legs supporting a rectangular storage area accessible through doors (22 and 24). Column 1, lines 25–31 discuss a barbecue work "station" having shelf space and slotted racks for holding grilling implements. Reference is made on the front page of the patent under "Other Publications" to "The Barbeque Store, Advertisement for BBQ Kargo Kart, 1 page, 1997."

U.S. Pat. No. 6,153,857 issued to A. J. Gunnels on Nov. 28, 2000, entitled "Portable Food and Utensil Storage Device," discloses a device having a plurality of segregated storage compartments for containing utensils, hot and cold food items, and a gas grill. As shown in FIG. 1, the device has a pivotable lid component (11), which opens to three separate storage compartments, each having a separate lid member (16). First compartment (9) is used to store perishable items in ice, another compartment (17) is used to store hot items and has heating coils embedded therein, while a third central larger compartment is used to carry other food or nonfood items. A receptacle (27) for supporting an umbrella is also provided, as are loops (30) and bands (14) in the lid for holding silverware and cups, respectively. Wheels (15) are also provided.

U.S. Pat. No. 6,216,488 issued to R. D. Rucker on Apr. 17, 2001, entitled "Multi Purpose Cooler," discloses another insulated container for carrying hot or cold foods. The Rucker container is primarily designed to be used at the beach or for carrying items to the beach. A side compartment (7) is provided for carrying small items, a built-in radio is provided, as is an umbrella holder (13). The lids (1) include indentation (1a) and drink holders (2a) to prevent objects from falling off, and the device includes a platform (12) so that it can be used as a dolly.

U.S. Pat. No. 6,344,630 issued to C. W. Jarvis et al. on Feb. 5, 2002, entitled "Thermoelectric Heated Food Service Cart," discloses an insulated food cart with electronic controls for keeping food trays or the like in a heated condition.

U.S. Pat. No. 6,499,411 issued to P. C. Brown on Dec. 31, 2002, entitled "Table Tent," discloses a mesh and frame structure having a plastic bottom section, support frames over which a mesh tent is laid, and clear plastic windows through which food situated within the tent can be accessed. Velcro® strips are used to seal the mesh to the plastic bottom and the plastic windows to the mesh tent.

Improvements (Quick and Clean Problem Solvers) February 2002, page 01, Barbecue Station® compact cabinet with work top showing cart with various serving trays and utensil holders in a barbecue accessory cart.

While there have been prior serving carts and barbecue utility carts, as well as disclosures of conveniences that might be conceivably applied to such carts, therefore, there have not, so far as the present inventor is aware, been any combined barbecue server and utility carts combining the unique features of the present inventor's cart, particularly with respect to introconvertability between use, first in spring, summer and fall as a full server and utility cart and in winter or other inclement weather as a smaller more compact server tray.

Accordingly there is a present need for an accessory, food display and serving cart for use in connection with barbecue carts and the like which can be converted from a serving cart for use outdoors to use as a food display and server for indoor use during inclement or cold weather.

OBJECTS OF THE INVENTION

It is an object of the present invention therefore to provide a food accessory display and serving cart for use in an outdoor barbecue environment which cart is readily convertible to a food display and serving accessory for use indoors during inclement weather or otherwise.

It is a further object of the invention to provide a convertible utility and accessory cart that can be converted from outdoor use as an accessory and serving cart for barbecue use to an indoor display and serving tray for use during cold weather.

It is a further object of the invention to provide a food server tray for use in the home, which can be converted to a barbecue accessory and server cart for use with an outdoor barbecue.

It is still a further object of the invention to provide an accessory and utility cart designed for use during barbecuing that can be easily and simply converted by removing the top and using it indoors for display and serving of comestibles and the like.

It is a still further object of the invention to provide a display and serving cart which can be used either as an accessory cart for barbecuing or as an auxiliary cart for displaying and serving food together or along with an accessory cart for use in home barbecuing operations.

It is a still further object of the invention to provide an accessory and serving cart for use in barbecuing and the like which can be used to maintain foods cold and covered for sanitary reasons.

It is a still further object of the invention to provide an accessory and serving cart convertible for both outdoor and indoor use and for maintaining both cold and heated food items.

It is a still further object of the invention to provide an accessory and food display cart for use in connection with barbecuing, a portion of which cart can be used as a display and serving tray in an indoor environment.

It is a still further object of the invention to provide a food display and serving cart having a separable top or tray section, which can be removed and used separately as a sanitary food display and server section.

It is a still further object of the invention to provide an auxiliary barbecue cart having a removable tray, which is separable, and can be used to display comestibles to guests and the like.

It is a still further object of the invention to provide an accessory and serving cart convertible for both outdoor and indoor use the food display and serving section of which can be removed from the cart portion and carried indoors for provisioning with food items to be displayed and served and then carried outdoors again for placement upon the cart portion, thereby aiding in efficient serving of food items at the location of an outdoor barbecue.

It is a still further object of the invention to provide an auxiliary barbecue cart formed from a polymeric composition to provide a strong but light display and serving tray type device for auxiliary indoor use.

It is a still further object of the invention to provide an auxiliary cart for use in home barbecuing, which can be converted to a workstation type cart, by providing an alternate top providing a work area and tool repository holders.

It is a still further object of the invention to provide an auxiliary utility and serving cart equipped with a removable serving top with a "sneeze shield" or other sanitary cover, which can be removed and used separately.

Other objects and uses for the invention will become clear upon review of the following descriptions and in conjunction with the appended drawings.

SUMMARY OF THE INVENTION

The present invention provides a utility cart for use in connection with barbecuing or outdoor grilling or other like outdoor food preparation and consuming activities. Such a cart is not meant for the barbecuing or grilling operation itself, as there are many such carts supporting a barbecue grill or the like, such cart frequently having storage space below, usually behind pivoting doors or closures. Rather the cart of the invention is meant for use in either storing barbecue equipment and supplies, or even more, for displaying and maintaining other food dishes which may be served with the barbecued food items themselves. For example, vegetable dishes, salads, breadstuffs, and the like, may be placed in the removable dishes recessed into the top and surrounded in general or in particular by ice or the like to maintain freshness. The lower portion of the cart is provided with closures such as pivoted doors or the like behind which various supplies or the like may be secured or held, or as an alternative, sliding drawers may be recessed into the sides of the body of the cart to contain various cooking equipment and supplies which may be conveniently stored close to the barbecuing or other equipment.

The distinguishing feature of the auxiliary barbecuing cart of the invention is a separable food container at the top of the cart which can be separated from the body of the cart for use by itself indoors in inclement or frigid weather or may be carried inside even in good weather to be loaded with the desired comestibles without bringing the entire cart indoors, whereby the foods for presenting or serving at a party may be loaded into the tray or trays or the top portion of the cart and then carried out again and positioned again on the top of the cart. The bottom of the upper tray is made to fit with a similar reverse configuration on the top of the cart, the preferred arrangement being protrusions from the bottom of the tray section which protrusions are of equal length and serve, when the top tray is used by itself, as feet to maintain the tray off the surface area upon which it is placed. A clear plastic cover is preferably pivoted from one side of the tray in a manner to completely cover the top of the tray yet allow a user visual access to the tray to make a preliminary selection of food to be consumed. When it is desired to remove such food items, the pivoted top or section of the top is lifted to gain access to such food items. The utility cart is provided with at least two wheels, and for ease of movement also preferably, with a handle at the other end and with small legs on that end which may be raised from the underlying surface and the cart trundled to whatever spot it is to be used.

Different tops may be provided for the cart of the invention to convert it to different types of utility wagons or carts such as for a tool caddy or the like.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and which by reference to, in connection with the following description and the accompanying drawings, one skilled in the art may be advised of the advantages and construction of the invention.

In the last few decades the art of barbecuing various meats and other foods on outdoor grills fueled by various fuel sources such as charcoal briquettes, bottled gas, or the like, has become very popular, particularly for occasions when a number of guests are present who may not fit conveniently in the usual suburban house or apartment, or on those occasions when the weather outside is particularly pleasant and one wishes to cook outside. The usual equipment for such grilling comprises a barbecue grill, frequently on wheels, and referred to as a "barbecue cart" or sometimes "portable grill" which can be either kept outdoors on a deck or patio or wheeled from normal storage in a garage or storage shed or the like for use. After cooking the meat, or other food, such food items are frequently carried into the house or apartment by the party givers or may be collected by the guests and transported to wherever they prefer to consume it, usually on a disposable plate or the like. While frequently other dishes are provided in the kitchen, it is frequently more convenient and efficient to have guests pick up the side dishes near the barbecue itself where the main or usually meat course is obtained. Thus, some hosts and hostesses will provide side dishes, frequently of cold comestibles such as coleslaw, potato salad and the like in or on dishes or trays in the vicinity of the barbecue. Frequently, it is also convenient to keep cooking utensils and supplies close to the barbecue wagon or cart, but not on it because of room considerations as well as considerations of cleanliness. Consequently, there have been provided of late, barbecue accessory carts having storage room both on the top for covered bowls and the like plus slide out food bowls for serving plus storage places for utensils such as serving spoons and forks plus the usual direct eating utensils. See the catalog reference cited in the above list of prior art references. Such carts, which can be wheeled from where the side dishes are prepared to where the barbecue is being held, considerably increase the efficiency and convenience of serving barbecue type meals, freeing the host and hostess from considerable back and forth travel and allowing guest to conveniently and largely independently serve themselves from one convenient point. However, like a barbecue cart itself, the accessory cart takes up considerable storage room in the off season for barbecuing and in addition still embodies some inconveniences in its operation.

The present invention significantly alleviates some of the major drawbacks of accessory carts for barbecuing by not only providing a cover for food displayed for serving on an accessory cart, but allows the entire server portion of the cart to be separated from the cart bottom along with the cover, and carried into a residence or apartment where it can be used during winter or cold weather months, thus doing, as it were, double duty. Since the top can, furthermore, usually be carried into the house or apartment more easily than moving the entire cart, especially by young, vigorous hosts or entertainers, it is often convenient during warm weather months to detach the top of the barbecue accessory or food display or serving cart and carry it into the kitchen to be loaded with food items to be served in conjunction with the barbecue and then after loading, carried back out to the vicinity of the barbecue cart itself and rejoined with the barbecue accessory cart of the invention. Small feet on the bottom of the display or the serving tray enable it to be set down on any flat surface such as a kitchen table for loading or a large living room coffee table for serving and then placed upon the top of its own accessory cart, such feet interengaging with the slots or orifices in the top of the accessory cart to prevent the tray from being accidentally detached. Various ways of actually interlocking the tray with the cart may be used.

Normally a clear plastic folding cover will be provided on the top of the tray, but a raised so called "sneeze cover" can also be used which can be collapsed or telescoped down upon the tray portion. The tray is water retentive so the lower portion can be filled with ice to keep food from becoming overheated. The top of the tray will be provided with an insert for matching placement and support of the bowls or trays or such bowls can be fitted directly into the main tray. In one modification of the main tray, it will be provided with main trays that can be individually filled with ice and into which trays there extends smaller food containing dishes or receptacles. In this way ice need not be supplied in the whole tray; and it will be proportionately lighter to carry, although the cooling effect or function of the ice will not last as long. In this particular arrangement, the ice containing receptacles can also be alternatively filled with hot water to keep heated food dishes warm longer as well as to separate them from the iced dishes. Alternatively, specially insulated secondary trays may be provided which can preferably be filled in a lower or surrounding compartment with hot water to keep them hot and inserted into the main tray to keep special heated food hot even though mixed into a generally iced food container. A central cover or bin is provided in the top of the tray into which ice can be loaded when ice is to be used in the entire tray. This section can be filled to the top with ice, which then will flow outwardly, as the ice melts under the various dishes to maintain all such dishes and any contained food for a longer period.

Figure 1:
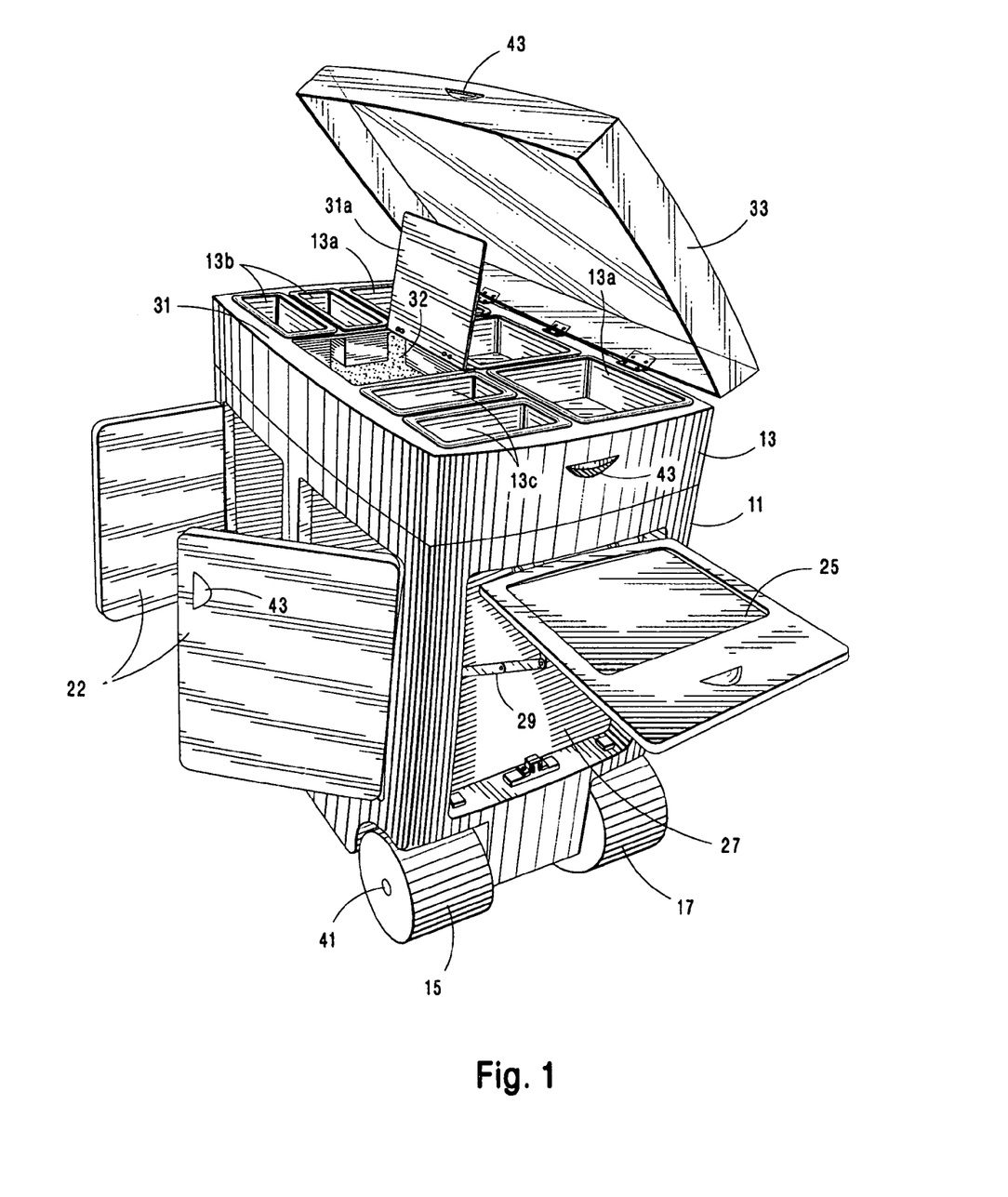
FIG. 1 is an isometric view from the right side and front of the convertible cart of the invention showing the clear plastic shield pivoted partially up and a front folding work surface pivoted upwardly.
Figure 2:
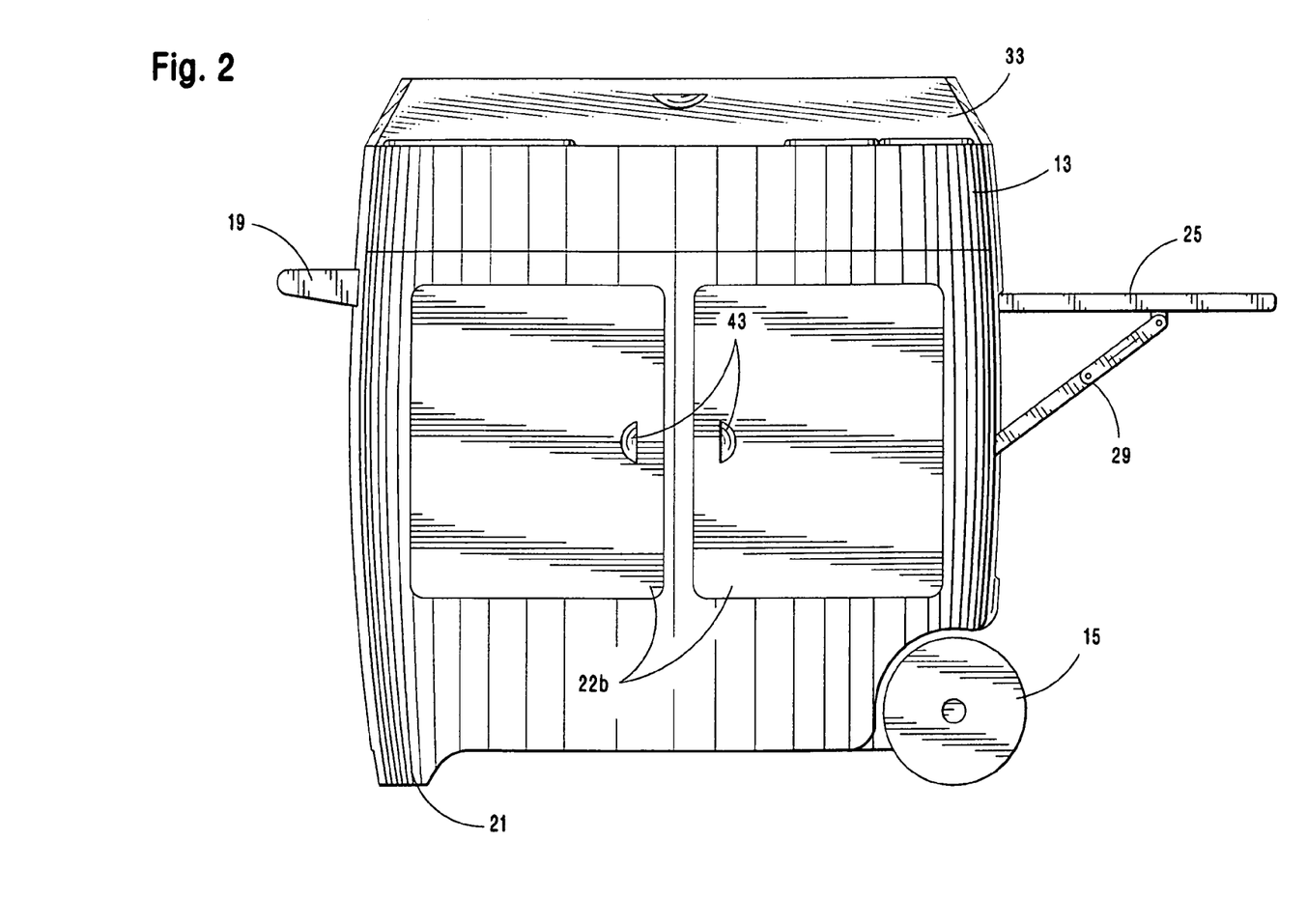
FIG. 2 is a right side elevation of the cart of the invention showing the front work surface folded out, with the support for such work surface straightened into supporting position.

Referring to FIG. 1, there is shown an isometric view of the barbecue display and serving cart of the invention wherein reference number 11 is the body of the cart itself and 13 is the body of the separable tray positioned on top. The cart 11 is provided with two relatively wide but small diameter wheels 15 and 17, recessed into the rear and bottom of the cart, and a handle 19 at the rear, which handle end of the cart is designated as the rear of the cart because the cart will usually be supported at the handle when moving with the feet 21, see FIG. 2, held off the supporting surface and wheeled forward with the wheels or wheeled end preceding so the person supporting the cart by the handle has a clear view forward. Alternatively, of course, the party supporting the handle could proceed in the other direction drawing the cart rearwardly particularly if the wheels must be moved across any barrier in the floor, deck or other surface across which the cart is being propelled. The body of the cart is provided on the right side with two access doors 22, see FIGS. 1 and 2, which will usually be hinged doors opening outwardly either with an open cabinet within, but more usually with shelves or slide out trays within. The interior can have various arrangements of shelving or utility supports which are consequently not shown internally of the cart. At the rear end of the cart is a foldout work surface 25 which, when pivoted out of shallow recess 27 in the end of the cart, is supported by folding bracket supports 29.

Figure 11:
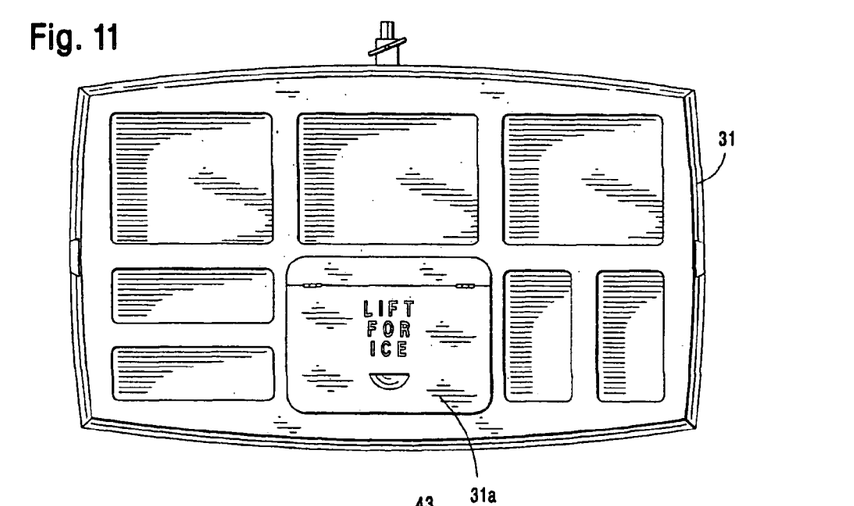
FIG. 11 is a plan view of the top of the tray with the food receptacles removed showing the openings in the top of the tray into which the food receptacles fit and with the ice access cover for ice addition to the tray in place.
Figure 12:
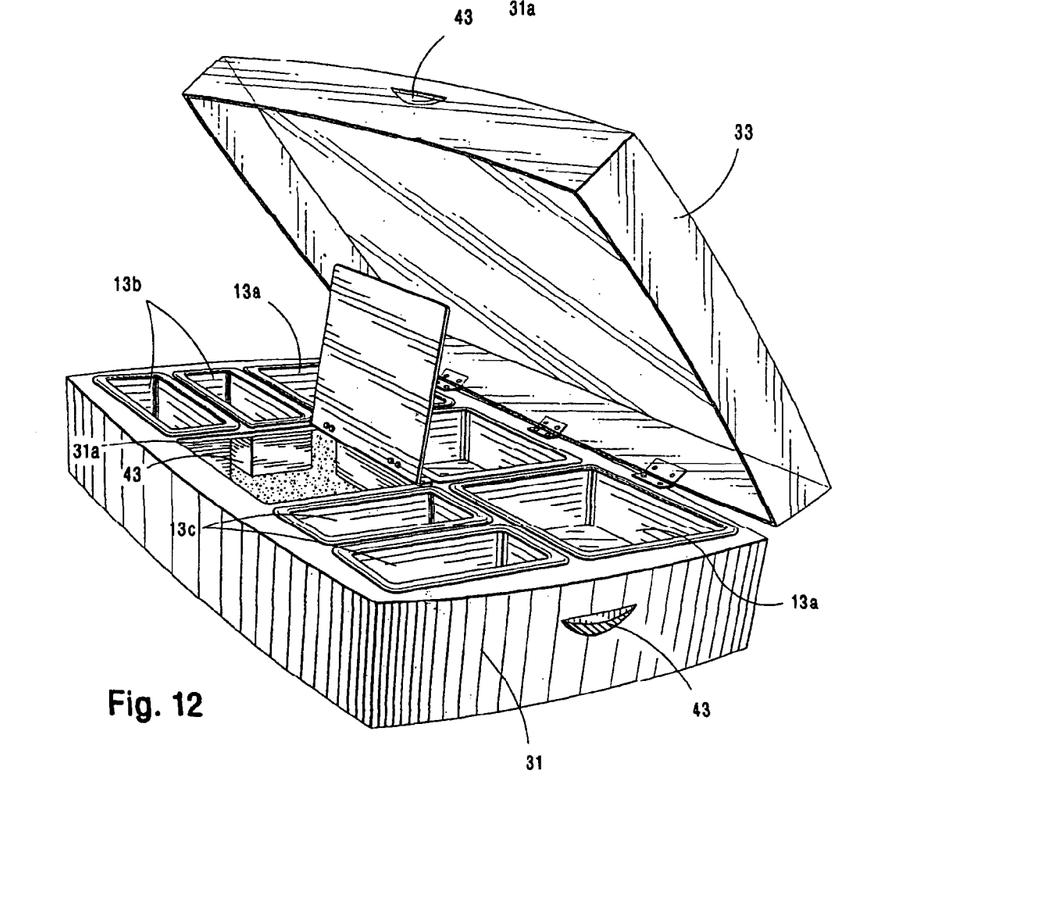
FIG. 12 is an isometric view of the somewhat enlarged tray of the invention by itself clear plastic lid raised on its hinges.

At the top of the cart 11 there is provided a hollow tray 13 having a top or internal cover 31 fitted in the top of the tray 13 serving as a dish support (See FIGS. 1 and 11). Such internal cover 31 has a series of orifices of the correct size for dishes 13*a*, 13*b* and 13*c* (see FIGS. 1, 6, 8, 13A, 13B and 13C) which fit into the cover 31 placed into the top tray 13.

The bowls or food containers or receptacle 13*a*, 13*b* and 13*c* may be removed from the top of the tray and loaded with food or comestibles in a kitchen or wherever convenient and then placed in the openings in the internal cover 31 to both keep them separated and spaced from each other and to support them above the bottom of the tray 13. In this way, if the tray is filled with ice, the bottoms of the dishes are surrounded with ice at least until it melts down, which takes some time particularly if the wall and bottom of the tray are hollow or otherwise insulated and the ice is piled high under the hinged door 31*a*. The internal cover 31 serves not only to maintain an overlapping seal with the flanges of the dishes as well as support such dishes, but also to space the dishes so ice, or at least ice water, can enter the space between such dishes to maintain them cool. It will not usually be found satisfactory to merely set the dishes into the ice, because the ice will be continuously shifting as it melts causing, the flanges 13*e* of such dishes to ride up over each other and disturbing the spacing between the dishes. In addition, as ice melts the dishes would sink into the tray usually unequally which is not only inefficient, but also unsightly. The internal cover 31 also prevents warm environmental air from reaching the ice between dishes and melting it as well as disturbing the spacing such dishes. The pivoting food cover 33 also aids in keeping the food cold, particularly if, when it is opened, it is not left open too long so that the cold air does not readily escape out. A low upstanding wall, not shown, may be provided on the top tray, which upstanding wall fits up into or extends upwardly into the preferably transparent top cover to prevent loss of cold air to the sides when the cover is pivoted open, such air tending to seek the lowest point available. A resistance to rapid movement of the cover upwardly may be incorporated into hinges 45 connecting the hinged cover 31*a* to the main cover as well as clear plastic flaps or vent holes in the cover 33, also not shown, arranged to open during movement of the clear cover 33 both up and down to allow warm air to escape upwardly as the cover is closed and to allow warm air to enter the top from above as it is opened in order to diminish suction of cool air away from the top of the tray by opening of the cover. If desired a one or two oneway flapped or otherwise restricted oneway vents may be included in the top cover if desired to vent air into and out of the cover to decrease the disturbance of the internal cool air when opening or closing the cover.

Figure 13A:
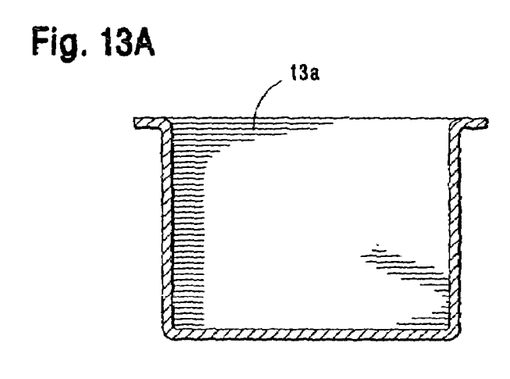
FIGS. 13A and 13B are cross-sections of matching bowls designed to fit in the openings in the top of the tray.
Figure 13B:
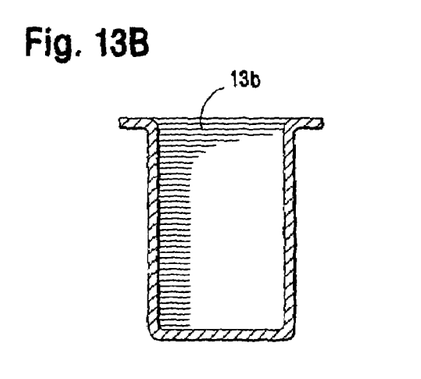

FIG. 13A shows a cross section of a larger food dish or holder 13*a* dimensioned to fit into one of the larger orifices in the top internal cover 31 of removable server tray 13, and FIG. 13B shows a cross section of a smaller dish 13*b*. Both of these are designed for containment of cold food and their bottoms will extend into ice in the bottom of the tray 13, such ice having been loaded into the tray 13 through hinged lid 31*a* attached to the internal cover 31.

Figure 13C:
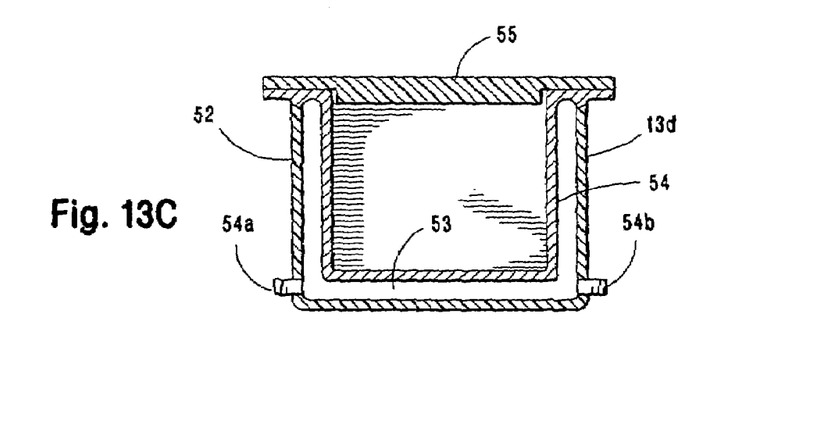
FIG. 13C is a cross-section of a doubly insulated tray with an internal chamber in which heated liquid may be placed or circulated to maintain the heat content of comestibles contained therein.
Figure 14:
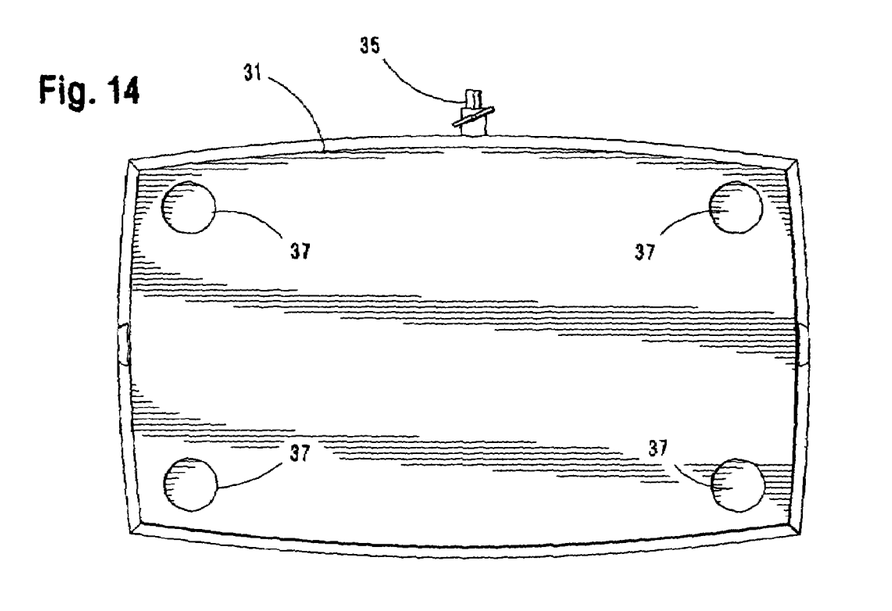
FIG. 14 is a view of the bottom of the tray showing the small feet which serve to support the tray on a supporting surface other than the top of the cart itself and which fit into matching depressions on the top of the cart itself to maintain alignment and interengagement of the two.

FIG. 13C, on the other hand, shows a cross section of a doubly insulated food container or dish 13C having a thick wall and bottom 52 in which internal insulation material, not shown, may preferably be contained and internally of the thick preferably insulated wall and bottom there may be positioned an internal orifice 53 extending over the bottom and up just under the inner top of the container which internal orifice may be filled with hot water to aid in maintaining food items in the insulated container hot. Such hot water may be placed in the container and drained out when cool through threaded connections 54*a*, 54*b* which may also be used, if desired, to continuously circulate hot water into and out of the container from a larger reservoir, not shown, provided in the lower portion of the server cart. Preferably the doubly insulated receptacle 13C will also be provided with an insulated closure type top which can be a lift off-type cover 55, but such cover may also preferably be provided with a suitable hinge 56 as connected to the top of the receptacle.

Figure 10:
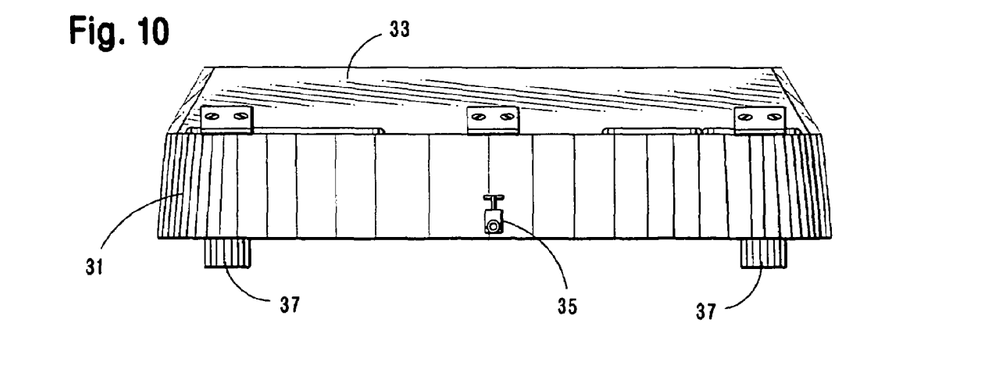
FIG. 10 is a view of the opposite side of the tray showing a drain in the bottom to drain out water from the melting of the ice needed to maintain food in the tray in a fresh condition.
Figure 15:
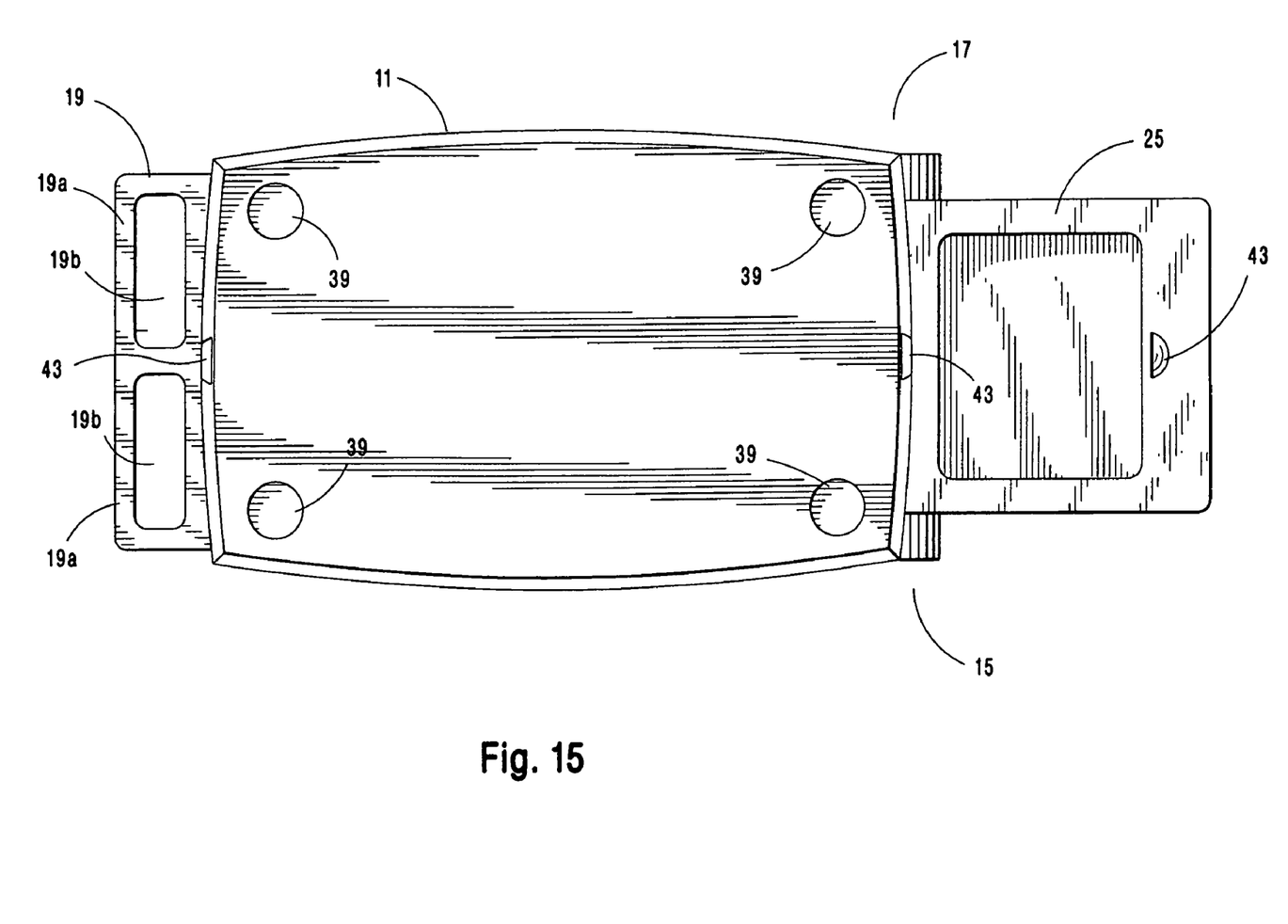
FIG. 15 is a plan view of the top of the cart showing the shallow openings on top arranged to receive the legs on the tray when placed on top of the utility cart and providing interengagement of the two to prevent the top from sliding off.

As shown in FIG. 10 the tray 13 is provided with a drain orifice or hole 35 at the side to drain the tray and such tray is also provided with short feet 37 designed to fit down into slightly larger orifices 39 in the top of the cart 11 as shown in FIG. 15. Such feet and orifices can be round or cylindrical as shown or might be square or rectangular or the like. The tray 13 could also be provided with downwardly deployable legs such as folding legs or the like, not shown, folding up into recesses in the bottom of the tray, also not shown, such deployable legs being alternatively used to support the tray at working height when carried into a kitchen or the like when filling or loading with food or to support it in a party room such as a living room, den or the like or when the removable tray is being used separately to display and make available food items during a party or the like.

Figure 4:
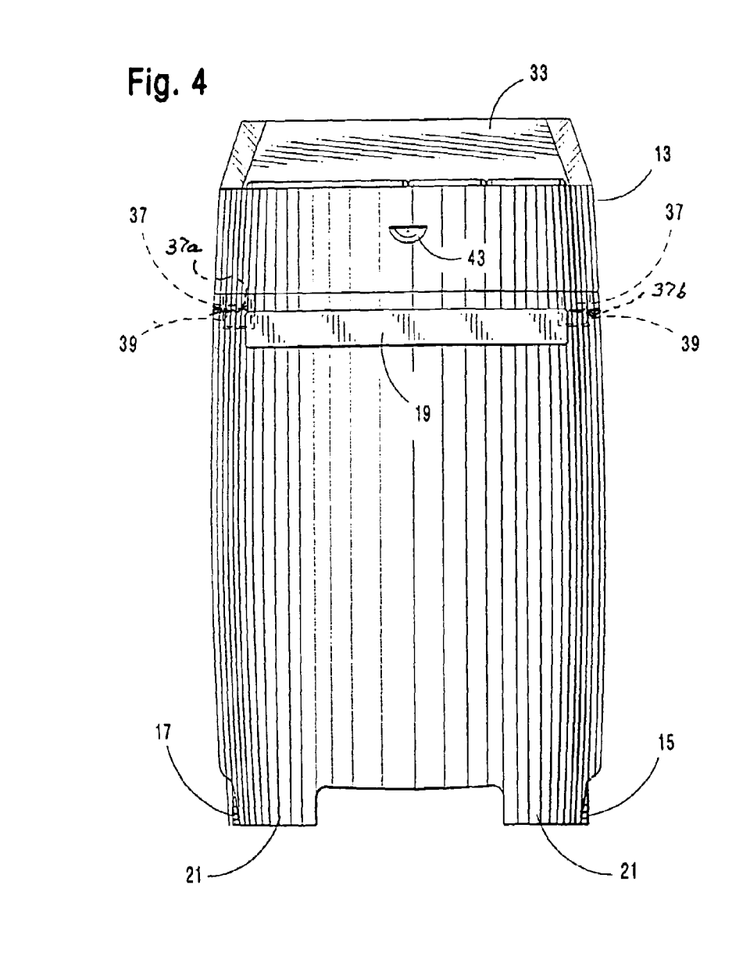
FIG. 4 is a rear elevation showing the maneuvering handle of the cart of the invention plus a handgrip in the end of the upper tray section.

It is preferable for the short feet 37 on the bottom of the tray 13 to be interlocked or held in the orifices 39 in the upper surface of the bottom portion of the server cart of the invention by some suitable means. One simple and convenient means for so doing is shown in FIG. 4 in which the feet 37 and orifices 39 are shown in broken lines and metal pins 37a having bulbus heads 37b conveniently sized for grasping by the fingers are inserted through appropriate orifices in the sides of the upper portion of the server cart into the orifices 39 and through the short legs 37 on the bottom of the upper tray 13 conveniently locking the tray 13 to the lower cart body 11. The bulbus heads of the pins are preferably contained in shallow indentations in the surface of the cart. Other equivalent means for locking the two sections together such as having the legs 37 have a configuration that will snap into a cooperating configuration of the orifices can be used. Alternatively the feet 37 can merely fit snugly in the orifices 39.

Figure 3:
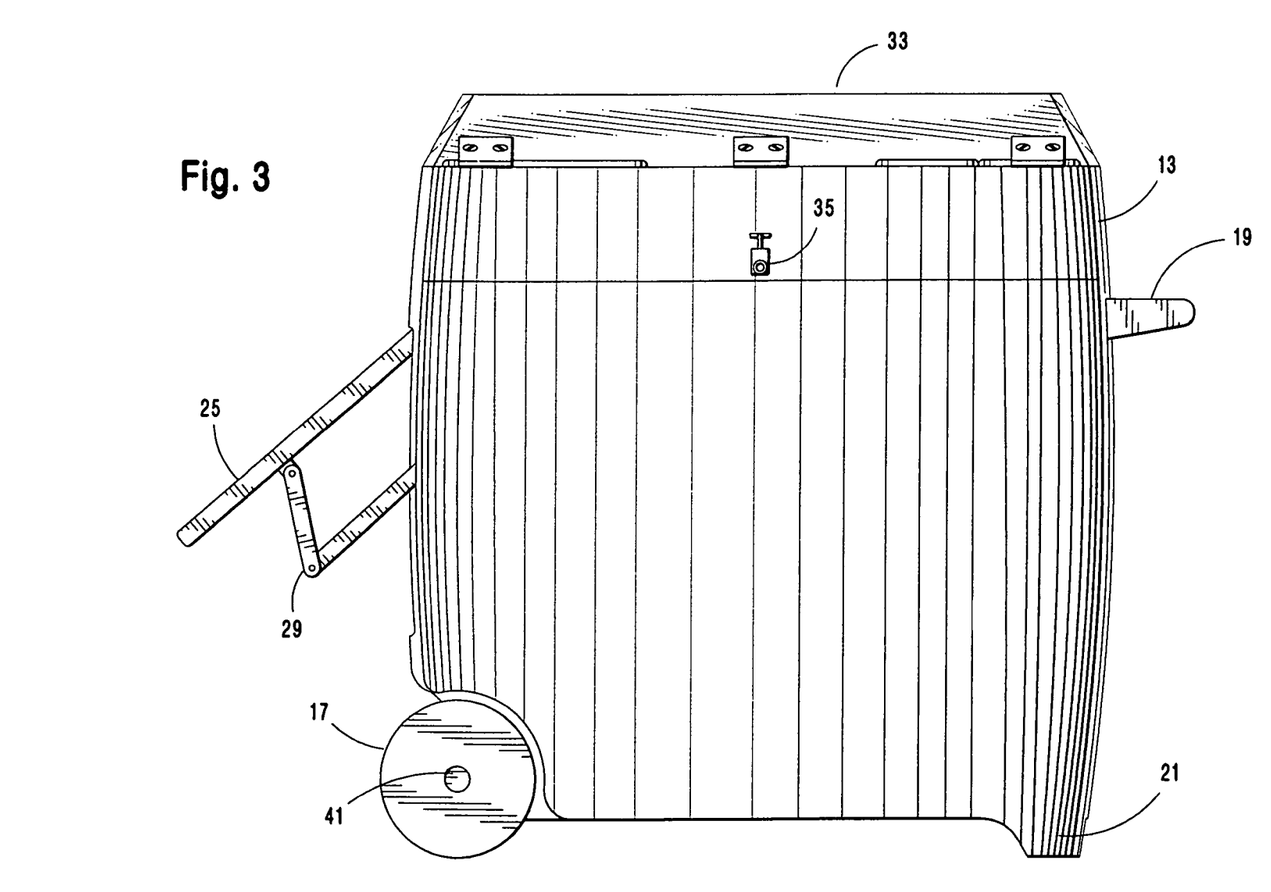
FIG. 3 is a left side elevation showing the front work surface partially folded down and with the support partially folded.
Figure 5:
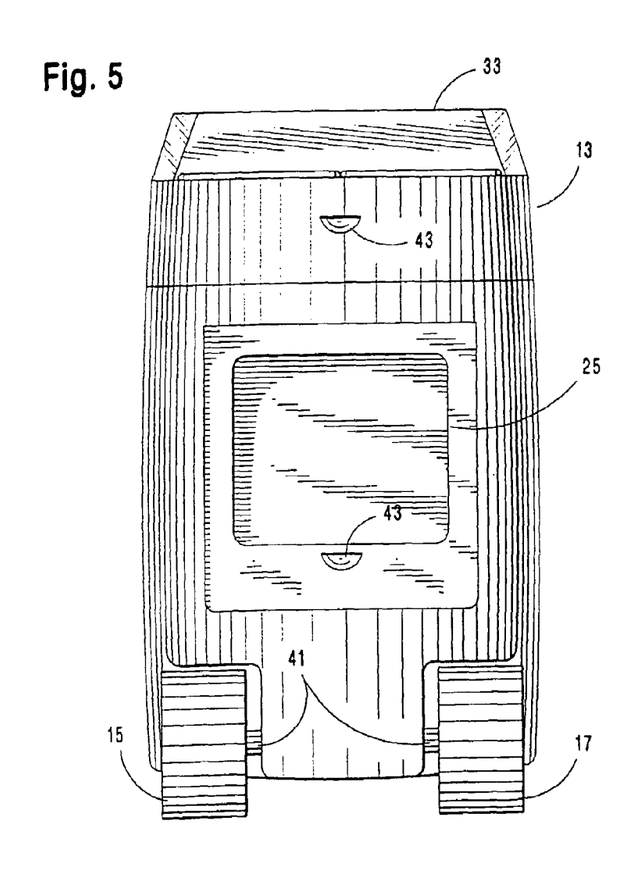
FIG. 5 is a front elevation showing the fold out front work surface extension completely folded into the recess in the body of the cart plus handhold or grasp recesses at the rear of the upper tray and in the surface of the work surface.
Figure 6:
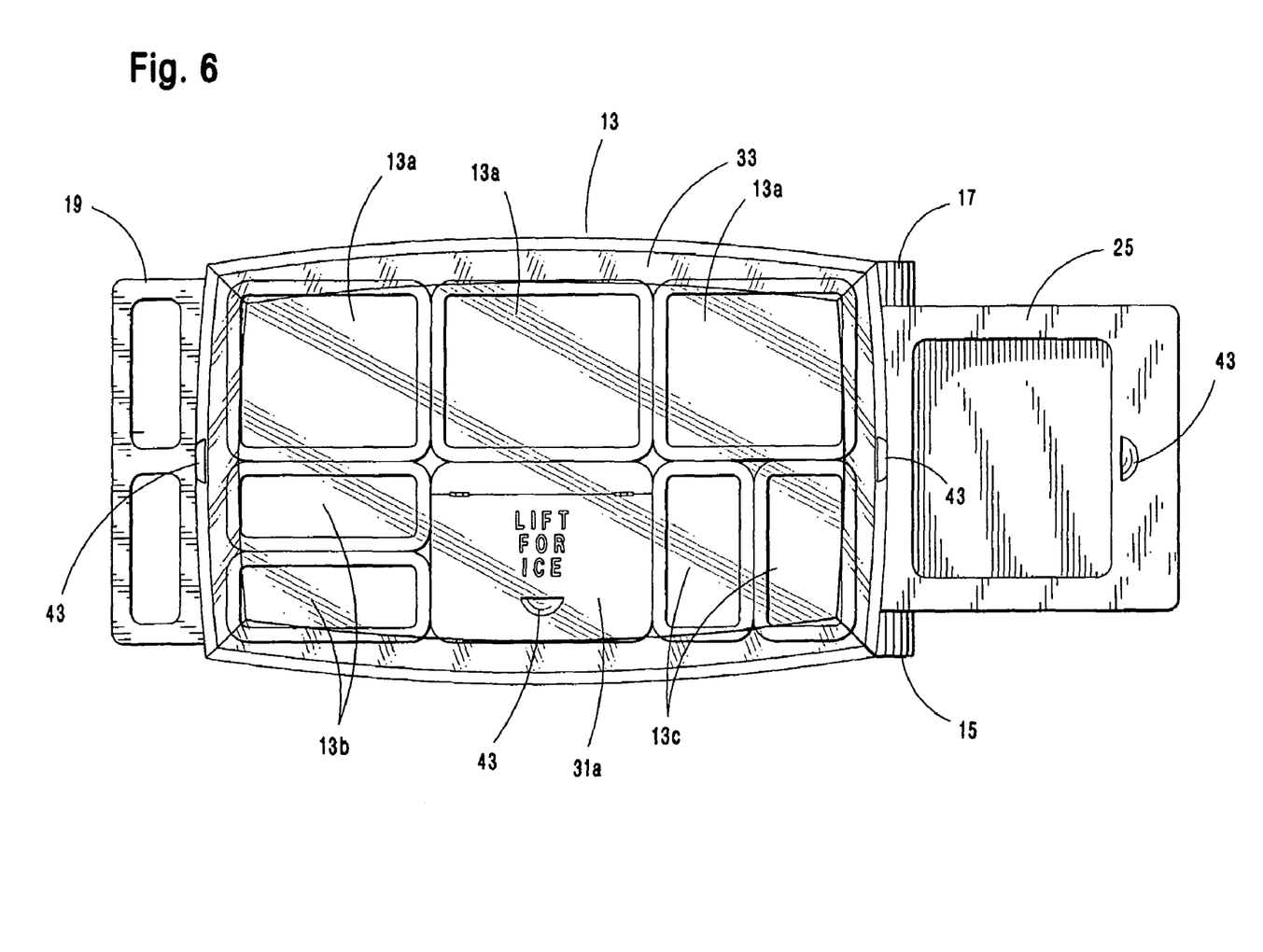
FIG. 6 is a top plan view of the top of the cart of the invention with compartmented bowls visible in place in the top of the tray and the front work surface in a fully deployed or folded out position.
Figure 7:
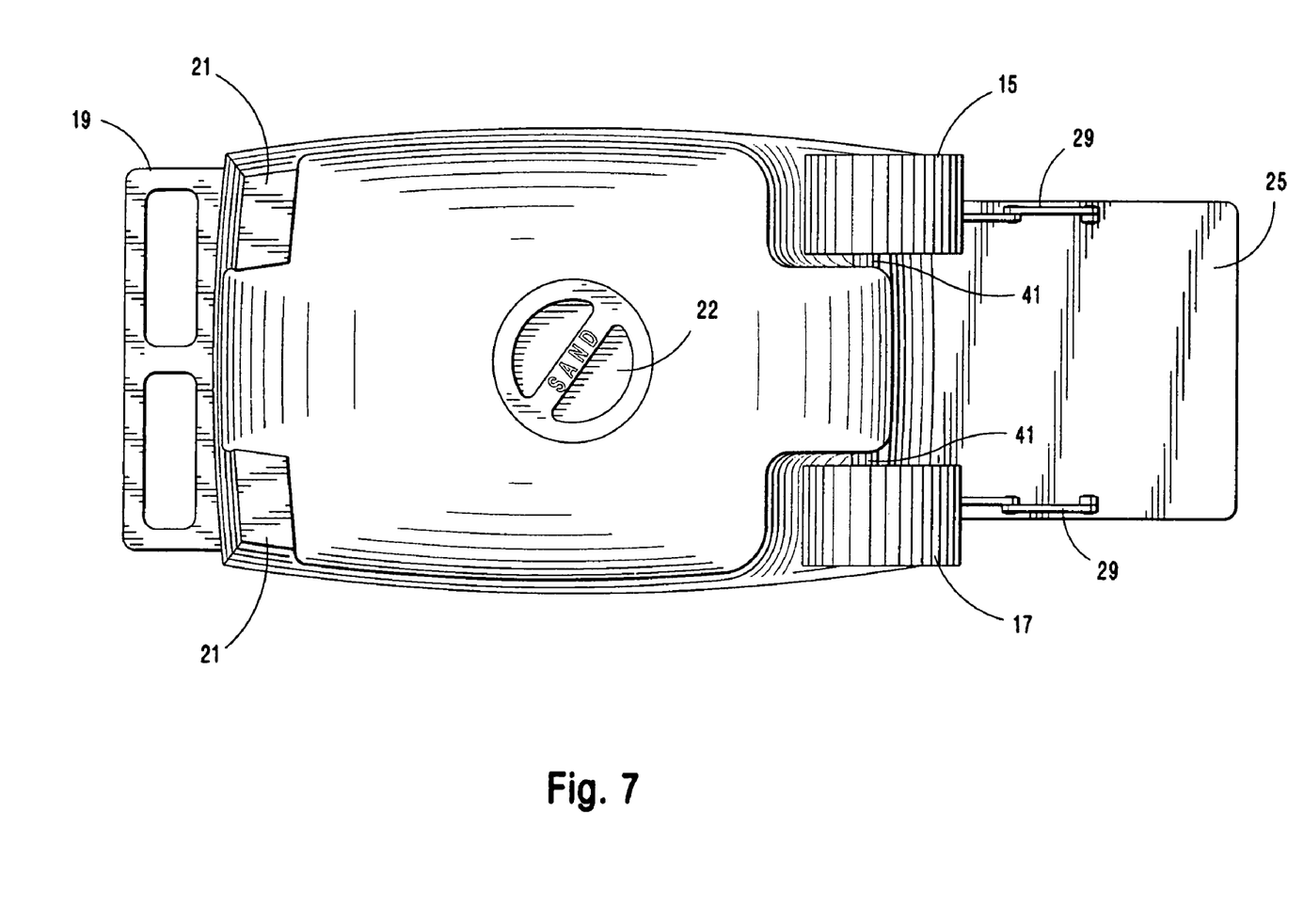
FIG. 7 is a bottom view of the cart of the invention with the front work surface completely folded out as in FIG. 6 and the rear handle visible as it is also shown in FIG. 6.

The offside of the cart 11 will usually be without openings as shown in FIG. 3, but it will be understood that appropriate doors could be placed in this side as well, for access to the interior of the cart. The feet 21, of the cart usually will be separate (see FIGS. 4 and 7), but could be formed as one wide crosswise foot. Usually the axle 41 for the wheels 15 and 17 will simply extend into the central part of the central portion of the cart as can be seen in FIG. 5. Handle 19 is conveniently, as shown in FIGS. 6, 7 and 15, a molded handle molded preferably as an integral portion of the cart body with suitable grasping sections 19a plus orifices 19b for the hand holds. Handgrips 43 are provided on the folding workspace surface 25, on the doors 22A and 22B, at both the ends of the tray 13, as well as on the transparent tray cover 33. It will be understood that these may be conventionally undercut finger grip indentations usually molded directly into the plastic of the cart and tray components. However, they could also comprise actual protruding handles of any convenient type. In addition, as described below, since the accessory cart will normally be kept outdoors during the summer and adjoining seasons which are also the seasons of greatest insect activity it is preferred to design the components of the cart to discourage as much as possible insect activity about the cart.

Since the serving cart of the invention is designed overall so as to be able to be left out in the elements all year long, if necessary, and, in any event, will usually be out at most households at least during the summer months, all undercut surfaces such as the handholds 43 in the transparent cover 33, the comestible tray or server portion 13, the foldout work surface 25, the doors 22a and 22b and the handle 19 are designed so as not to have flat, lower or undercut surfaces which might encourage insect nesting. In particular it is desirable to discourage wasps and hornets from nesting in any protected location. Thus, the enumerated parts and particularly the handgrips are molded integrally into the various parts with sufficient finger grip surface to effectively move the parts, but with a depth and curvature which will discourage the nesting of insects because it provides minimum protection in the form of overhang from rain and sun. For the same reason, the bottom of the cart base is preferably somewhat downwardly curved and smooth to discourage insect nesting and the handle 19 is provided with a slight angle upward also to discourage insect nesting. The handgrip 43 in the upper surface of the ice cover 31a is also not undercut in any way also to discourage the presence of any insects under the undercut.

The hinges used to connect the clear cover 33 to the tray 13 are preferably spring loaded so that when lifted the cover will remain in any position it is placed. Similar spring loaded hinges are frequently mounted upon stereo turntable covers and are well known in the art. Any other similar hinges or connecting members having the same function may be used. The hinges used to connect the doors 22a and 22b to the cart base and the foldout working surface 25 to the cart base are preferably integrally molded into the cart base and the foldout structures are provided with curvilinear male extensions from the folding members which snap into female partially hollowed out reception areas on the base designed to receive the male extensions and allow back and forth swinging movement of the respective panels or closure members. Any other known hinge arrangement of sufficient strength and durability may be used. One of the molded hinge arrangements preferably in the center of the edge of the foldout working surface may be provided with an interference fit to lock the extension tray or working surface 25 in extended position.

The designation on the ice lid on the tray of "Lift for Ice," which is preferably molded into the lid, indicates not only where ice may be loaded in to the tray, but also that this is the ice access lid. Such lid, which is preferably hinged as shown, but could comprise a lift-off lid, can be opened not only to load ice into the top tray where it will, if of the correct general consistency, flow out under and between the dishes 13a, 13b and 13c, but also will provide access for removal of small portions of the ice for drinks and the like. Furthermore, the access lid when in place provides a convenient place for a user of the serving tray to place their dish and other dining utensils when dishing out food items onto such dish.

The lowest point of the bottom of the cart which as mentioned above is curved downwardly on the exterior in the center to discourage insect nesting is provided at the lowest point with a preferably threaded opening into which a plug or closure preferably marked "Sand," but which can also be unmarked as shown, is in turn threaded and through it small bags of sand may be inserted into the bottom of the cart if desired to stabilize the cart in windy weather. The plug 22 itself may also be filled with sand, gravel or other weighty material to in effect ballast the cart against wind and the like when the plug is threaded into the bottom of the cart. Having the sand or other weighty material at the lowest point of the bottom of the cart aids in lowering the center of gravity of the cart as a whole.

The cart and tray of the invention can be made of any suitable material, but is most conveniently formed of high density molded polyethylene or polypropylene, but can also be formed from any other suitable plastic materials. The top tray portion and lower cart portion are more particularly and preferably made from so-called no maintenance ultraviolet light protected or resistant washable, physical abuse durable, rubberized polypropylene and is preferably provided with non-marring rubberized tires. However, any suitable construction material may be used. The tray cover may be made from any clear scratch resistant polymer material. Preferably the cover is hinged to the tray portion with self tightening or spring loaded hinges that tighten as the cover is raised, thereby allowing the cover to remain up in almost any open position, plus also as indicated above, prevent the cover from being moved too quickly in order to disturb as little as possible the layer of cool or cold air that gathers or accumulates in the top of the upper tray. As noted, a screened air vent preferably with a one way air valve may be provided in the cover to allow air to enter or leave the cover as it is moved up or down in order to disturb the cold air within the tray as little as possible when opening or closing the top or cover for the tray.

The cart and tray can be made in any convenient dimensions, but the following dimensions have been found to be preferable:

| | | |
|---|---|---|
| Length of cart & upper tray | 30 to 40 inches | Preferred 36 inches |
| Overall cart height | 35 to 42 inches | Preferred 30 inches |
| Depth of Tray | 5 to 8 inches | Preferred 6 inches |
| Width of cart tray | 20 to 25 inches | Preferred 22 inches |

Figure 8:
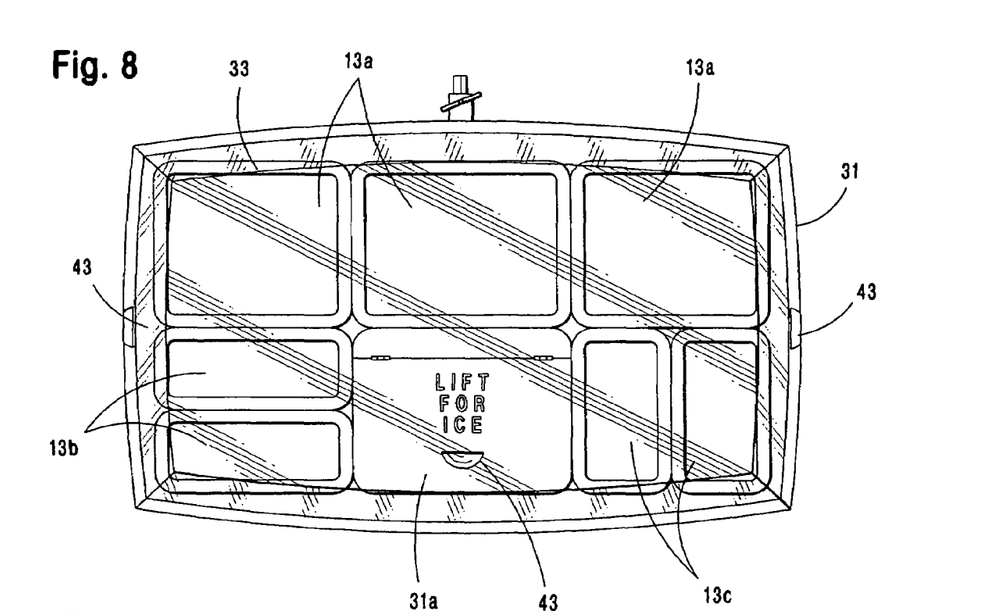
FIG. 8 is a top plan view of the removable tray removed from the cart with the interior bowls visible through the clear plastic cover or top.
Figure 9:
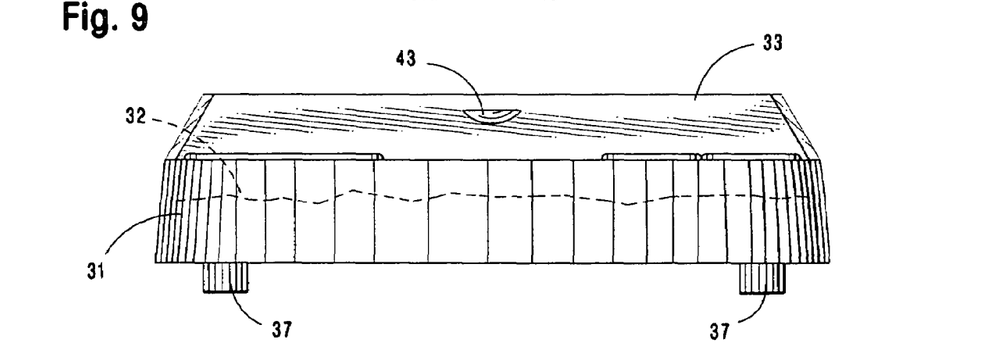
FIG. 9 is a side view of the tray removed from the cart showing the shallow feet extending from the bottom, which feet interfit with the orifices in the top of the cart plus a hand hold in the clear plastic cover shown in its closed position.

It is not desirable to have the server and utility cart too large because the upper removable tray may then be too large, heavy or cumbersome to conveniently handle when carrying it fully loaded from an indoor food source to the outside serving location to place on the cart bottom. However, it may be understood that the upper tray may also be formed in two separable sections which can be carried individually. In such a construction the ice loading opening marked in FIG. 8, "Lift for Ice," would be split into two sections also and preferably the two sections moved into a more central position in the half tray size. Of course, the removable tray 13 could also be split into two separate, but unequal sized, side-by-side trays.

The present invention provides a server and accessory cart for use with barbecue carts having considerable more convenience than previous such carts in that the top portion of the cart, in the form of a tray or food server, can be removed and used separately when barbecuing outdoors is not practical, due, for example, to inclement or frigid weather, and can also be separately taken indoors to be loaded with comestibles all at once and then conveyed as one unit to the cart outdoors and thereupon used as a portion of the server cart in the vicinity of or in conjunction with outdoor barbecue equipment. Thus, the cart of the invention is convertible for both summer and winter use. It is usually not practical to bring an entire server cart into the cramped conditions of any but the largest homes and even if it was the wheels are frequently less than clean or otherwise desirable for use on carpets or the like after outdoor use and storage either outside or in a garage for bringing into a home on polished floors or clean rugs or carpets. The bottom of the top tray, however, is inherently kept clean by being brought into close contact with the top of the lower portion of the cart and is of a size which can be easily carried and placed on the usual coffee table or the like where its top is at a convenient height for party or other visitors to help themselves. If constructed in two sections, moreover, the top or serving tray will be even less bulky or heavy to transport or carry, although perhaps less convenient because two elements must then be transported.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention

I claim:

1. A server and utility cart for use in conjunction with barbecuing equipment comprising:
   a. a movable cart having at least two wheels and a grasping means for guiding and propelling said cart manually,
   b. a removable tray mountable to the upper portion of the cart,
   c. said tray having moisture impervious sides and bottom such as to be able to retain liquid and ice,
   d. stabilization and alignment means to releasably maintain the tray and cart in alignment with each other,
   e. storage compartment means in the cart to store items within the cart,
   f. the upper portion of the cart being moisture impervious to provide weather resistance,
   g. a transparent pivotable cover mounted upon the tray for sanitary and temperature equalization purposes.

2. A server and utility cart in accordance with claim 1 wherein the tray is stabilized on the cart by extended aligning elements extending between the tray and the top of the cart and received into orifices, one of each of such elements being positioned on the cart and the other on the tray.

3. A server and utility cart in accordance with claim 2 wherein the extended aligning elements are on the bottom of the tray and act as legs for the tray when removed from the cart and the interengaging means on the upper portion of the cart are orifices in the upper portion of the cart.

4. A server and utility cart in accordance with claim 3 wherein locking elements are provided to restrict withdrawal of the extended aligning elements of the tray from the orifices of the cart.

5. A server and utility cart in accordance with claim 1 wherein the tray is equipped with at least one double walled downwardly extending receptacle dimensioned to fit within each other, the lower or outer of said downwardly extending orifices being adapted to contain thermal temperature modifying means to control the temperature of food items in the inner receptacle.

6. A server and utility cart in accordance with claim 4 wherein the element to restrict withdrawal of the extended aligning elements are in the form of pins extending laterally through such elements.

7. A server and utility cart in accordance with claim 1 wherein the tray is adapted for containing a cooling medium and the inner receptacles are dimensioned to extend into at least partial engagement with such cooling medium in order to cool such receptacles downwardly extending portions.

8. A server and utility cart in accordance with claim 5 additionally comprising a heavily insulated receptacle adapted to retard the heat from elevated temperature food items within from passing readily into the cooling medium.

9. A server and utility cart in accordance with claim 7 wherein the cooling medium is intended to be ice and the inner receptacles are maintained in place in the ice by an inner cover adapted to position the inner receptacles.

10. A server and utility cart in accordance with claim 8 wherein the heavily insulated receptacle is provided with an inner compartment spaced from the outer surface by an insulating medium, with said inner compartment being adapted to contain a heating medium.

11. A server and utility cart in accordance with claim 10 wherein the cooling medium in the tray is ice and the heating medium in the inner compartment in the heavily insulated receptacle is elevated temperature water.

12. A server and utility cart in accordance with claim 8 additionally comprising an insulated cover adapted to removably cover the heavily insulated receptacle to additionally retard loss of heat from such receptacle.

13. A server and utility cart in accordance with claim 11 wherein the heating medium is injectable into the inner compartment of the heavily insulated receptacle through a fitting.

14. A server and utility cart in accordance with claim 11 wherein the heavily insulated receptacle has two spaced fittings allowing a circulation of heating medium to pass in a continuous circuit from a heating medium reservoir provided elsewhere.

15. A convertible server and utility cart for use with barbecuing and outdoor grill equipment comprising:
   a. a lower wheeled cart with inside storage space,
   b. an upper removable tray having length and width dimensions generally similar to those of the cart effectively removable from the cart and usable separately as a food server and transporter,
   c. aligning means for aligning and securing the tray from lateral movement with respect to the lower wheeled cart when combined and used together,
   d. said tray having removable food receptacles in the upper portion supported in a spaced relationship with the bottom of the tray providing room under the food receptacles for temperature modifying material to be continued in the tray under the food receptacles.

16. A convertible server and utility cart for use with barbecuing and outdoor grill equipment in accordance with claim 15 additionally including a transparent protective cover hinged to the upper removable tray.

17. A convertible server and utility cart in accordance with claim 16 wherein said cart and upper removable tray is formed of molded plastic and is provided with a design including a slightly slanted bottom panel with the lowest portion at an inlet for weighted material.

18. A convertible server and utility cart in accordance with claim 17 wherein the removable tray has lower feet for supporting the tray on an indoor surface which feet are arranged to fit into matching openings in the top of the cart when said tray is on said cart and serving to align and hold said tray on said cart.

* * * * *